Feb. 3, 1942.  C. S. McCARTHY  2,271,799
BRAKE ACTUATOR
Filed Nov. 7, 1939  3 Sheets-Sheet 1
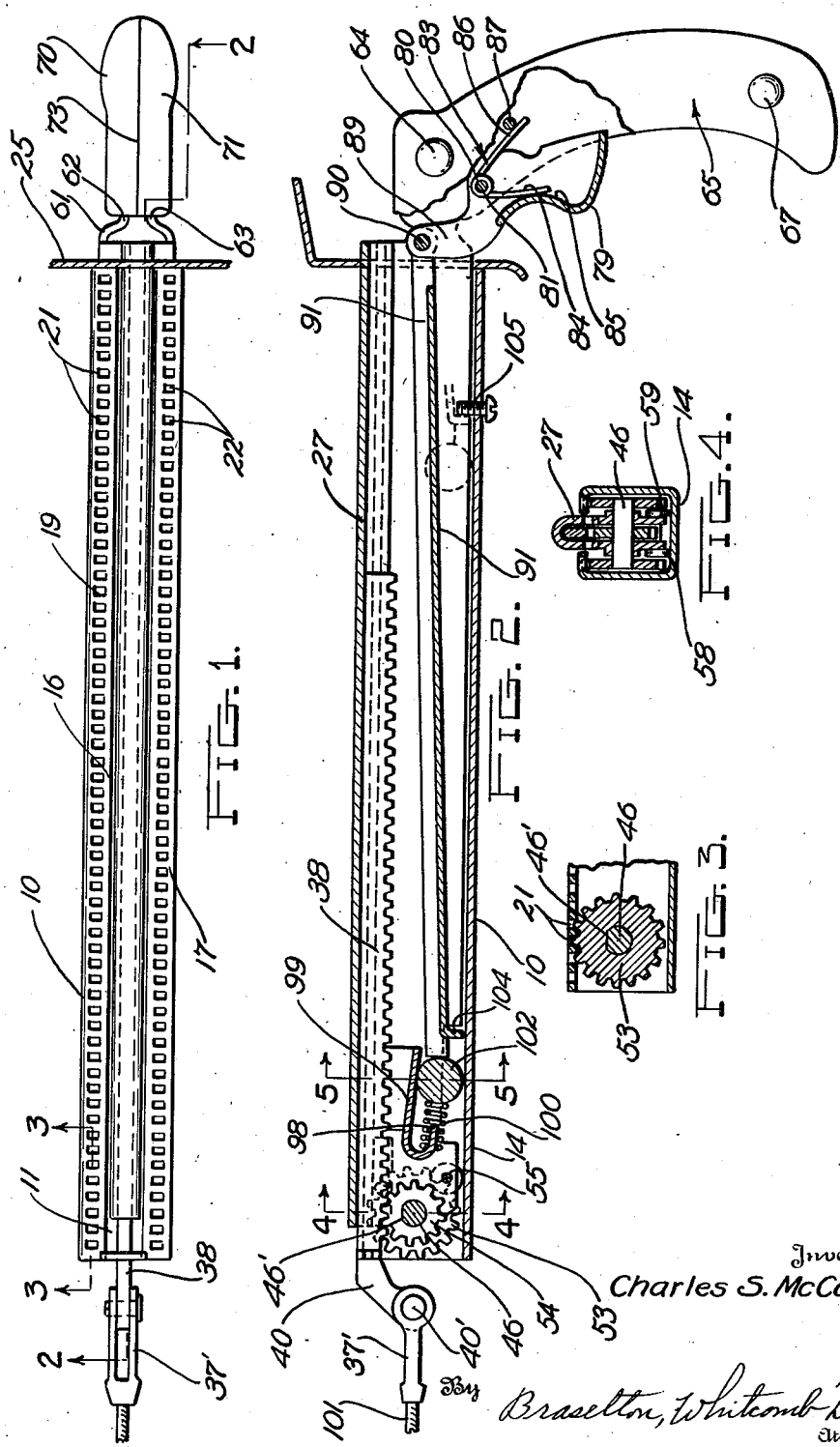
Inventor
Charles S. McCarthy
By Braselton, Whitcomb & Davies
Attorney Feb. 3, 1942.  C. S. McCARTHY  2,271,799
BRAKE ACTUATOR
Filed Nov. 7, 1939  3 Sheets-Sheet 2
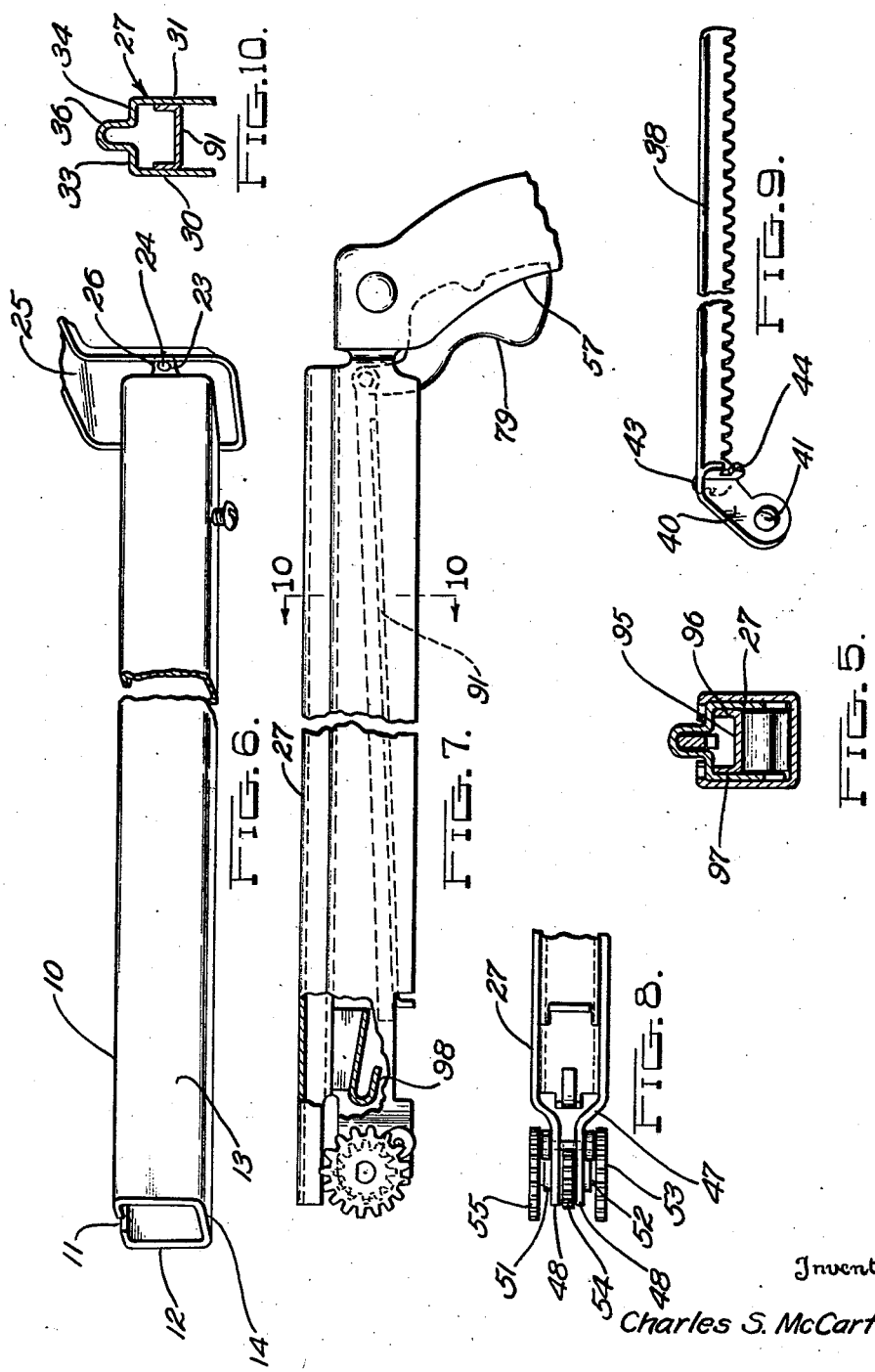
Inventor
Charles S. McCarthy
By Braselton, Whitcomb Davies
Attorney

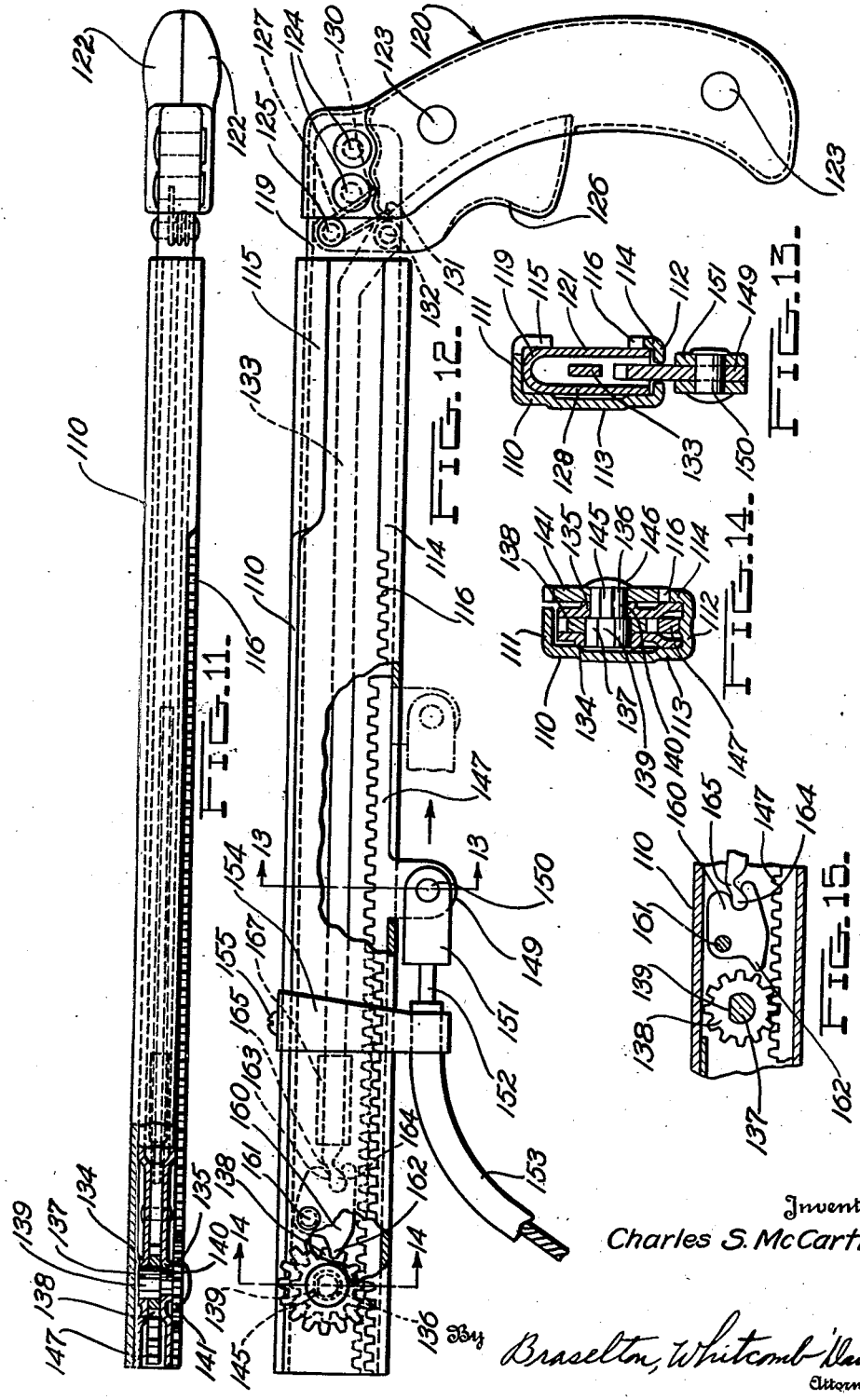

Patented Feb. 3, 1942

2,271,799

UNITED STATES PATENT OFFICE 2,271,799

BRAKE ACTUATOR

Charles S. McCarthy, Toledo, Ohio, assignor to The Bingham Stamping Company, a corporation of Ohio Application November 7, 1939, Serial No. 303,248

17 Claims. (Cl. 74—502)

This invention relates to control operating mechanisms and more particularly to an arrangement adapted to control the braking mechanism of an automotive vehicle.

The invention has as one of its principal objects the provision in control mechanism of a novel motion reducing means to effectively control the application of force for setting in braking position the brakes of an automotive vehicle.

The invention includes as one of its objects the provision in an emergency or hand operated brake mechanism of a novel force multiplying means whereby the force applied by the operator through the actuation of the manually operated member to set the brakes of an automotive vehicle in braking position is materially increased.

An object of the invention is to provide in a brake manipulating or controlling device means for materially increasing the force applied by the operator so that such increased force is transmitted to the braking mechanism of an automotive vehicle.

Another object of the invention is to provide in a brake manipulating or controlling device means whereby movement of one of the elements of the mechanism is transmitted to another element with a change in its magnitude or extent.

A further object of the invention is to provide vehicle brake controlling mechanism arranged for movement in a straight line and adapted to be positioned conveniently with respect to the operator of the vehicle as on the dashboard or instrument panel of said vehicle.

A still further object of the invention is to provide simple yet effective means for locking in position and releasing the mechanism which operates the brakes of an automotive vehicle.

A further object of the invention is to provide a simplified mechanism control wherein the elements comprising the same are formed of sheet metal stampings, thus facilitating ease of manufacture and assembly and providing a substantial savings in the production of the completed unit.

Further objects and advantages are within the scope of this invention such as relate to the arrangement, operation and function of the related elements of the structure, to various details of construction and to combinations of parts, elements per se, and to economies of manufacture and assembly and numerous other features as will be apparent from a consideration of the specification and drawings of a form of the invention, which may be preferred, in which:

Figure 1 is a top plan view of an arrangement of the mechanism control of my invention;

Figure 2 is a longitudinal sectional view taken substantially on the line 2—2 of Figure 1;

Figure 3 is a detail sectional view taken substantially on the line 3—3 of Figure 1;

Figure 4 is a transverse sectional view taken on the line 4—4 of Figure 2;

Figure 5 is a transverse sectional view taken on the line 5—5 of Figure 2;

Figure 6 is an isometric view of the relatively stationary outer casing of the control mechanism shown in Figure 1;

Figure 7 is a side elevational view of the relatively movable member with a portion broken away for the purpose of showing certain elements forming part of the motion reducing means of the invention;

Figure 8 is a bottom plan view of one extremity of the manually movable member of the control mechanism showing the arrangement of the motion reducing means illustrated in Figure 7;

Figure 9 is an isometric view of a member which coacts with the motion reducing means of the invention utilized to transfer movement of the manually movable member to the vehicle braking mechanism;

Figure 10 is a transverse sectional view taken substantially on the line 10—10 of Figure 7;

Figure 11 is a top plan view of a modified form of the mechanism control of the invention;

Figure 12 is a side elevational view with certain portions broken away for the purpose of illustrating a modified form of locking means;

Figure 13 is a sectional view taken substantially on line 13—13 of Figure 12;

Figure 14 is a transverse sectional view taken substantially on line 14—14 of Figure 12;

Figure 15 is an enlarged detail view illustrating the locking means for the control mechanism shown in Figure 12 in its released position.

The invention has been illustrated as incorporated in a mechanism utilized for manipulating and controlling the brakes of an automotive vehicle, but I contemplate that the invention may be used wherever it is found to have utility.

Referring to the form of the invention shown in Figures 1 to 10 inclusive, the mechanism control illustrated includes a relatively stationary support or tubular open ended housing 10 preferably of sheet metal and formed to a substantially rectangular configuration having a longitudinal opening 11. As illustrated in detail in Figure 6, the housing or guide member 10 has substantially parallel side walls 12 and 13 connected together by a uniplanar section 14. The other end of the side walls 12 and 13 terminate into inwardly extending spaced portions or ledges 16 and 17. The ledges 16 and 17 are each provided throughout their length with a plurality of spaced openings 19, thus forming the gear tracks or racks 21 and 22 respectively.

The walls 12 and 13 at the rearward end of member 10 are each provided with an integral outwardly projecting ear 26, and the ears are each formed with an opening 23 adapted to receive a rivet such as 24 for the purpose of securing the member 10 to a support 25. The support 25 may be secured to the dashboard (not shown) of an automotive vehicle or to any other convenient portion of the vehicle readily accessible to the driver. Located within the housing 10 and arranged for sliding movement is the manually operable element or mechanism control manipulating member 27. The member 27 is preferably formed of sheet metal and comprises the substantially parallel side walls 30 and 31 having inwardly extending ledges or shoulder portions 33 and 34 which connect the side wall 30 and 31 with a central section 36 of U-shaped configuration adapted to be received in the slot 11 formed by ledges 16 and 17 of guiding member 10. The U-shaped section 36 is adapted to receive a toothed or rack-like drawbar or member 38 particularly shown in Figure 9 which terminates at one end in an angular depending portion 40 having an opening 41. The drawbar 38 is provided adjacent to its angular portion 40 with lateral projections 43 and 44, each having a notch or kerf formed on the end portion thereof, each of said notches being adapted to slidably engage respectively the edges of the ledges 16 and 17 of the housing 10 providing suitable guiding means for the drawbar 38 and thus preventing any binding action between it and the housing 10 whereby movement imparted thereto is transmitted to the braking mechanism of the vehicle through suitable clevis connection 37' secured to the drawbar 38 by a rivet 49' passing through the opening 41.

At the forward end of the manipulating member 27, the walls 30 and 31 are bent inwardly as at 47 to form the reduced parallel end section 48 as particularly shown in Figure 8. The walls of the reduced section 48 are provided with aligned openings for receiving suitable bearings 51 adapted to journal a stub shaft 52. Fixedly secured to shaft 52 are the gears 53, 54 and 55. The gears 53 and 55 are of the same diameter, and in the embodiment illustrated each include 16 teeth, these gears being fixed to the ends of the shaft 52 and so positioned that their teeth are in alignment with and engage in the openings 19 of the spaced racks 21 and 22 formed on ledges 16 and 17 of the housing 10. The centrally supported gear 54 located between the walls of the reduced end section 48 is of smaller diameter than the gears 53 and 55, and in the embodiment illustrated has twelve teeth. The gear 54 is so positioned on shaft 52 that its teeth are in engagement with teeth formed on the member or drawbar 38, and thereby impart when rotated rectilinear movement to the latter. The walls of the reduced end section 48 are also provided with aligned openings located below the bearings 51 for the purpose of receiving a rotatable shaft 55 to which are secured rollers 58 and 59 adapted to contact with the inner surface of the uniplanar portion 14 of the stationary housing 10.

The side walls 30 and 31 at the rearward end of the member 27 adjacent the bracket 25 are bent as at 61 to form a reduced section having parallel wall sections 62 and 63 to which is secured a handle or grip member 65 as by a rivet 64 received in aligned openings provided in the grip member 65 and wall sections 62 and 63 of the member 27. The grip member 65 in the embodiment illustrated includes similarly shaped matched half sections 70 and 71 abutting as at 73 and are further secured together by rivet 67 to form a hollow handle. It is to be noted that the upper forward portion of the member 65 is provided with a slot or opening 57 to receive a pivoted finger trigger 79.

The finger trigger 79 preferably of U-shaped cross section is pivoted as at 80 upon a rivet or pin 81 which extends through the projecting walls 62 and 63. The piece 79 is urged to its outermost position by means of a hairpin spring 83, which is coiled around the pin 81 having one leg portion 84 in contact with the inner wall 85 of the finger piece 79 and the other leg portion 86 in engagement with an abutment or stop pin 87 located within the hollow handle 65. The trigger 79 is formed at its upper end with spaced wall portions 89 which extend upwardly between the side walls 30 and 31 of member 27, and are provided with aligned openings to receive a pin or rivet 90, the latter also passing through aligned openings formed in the extremity of a bar or member 91 which forms a means for controlling the actuation of the clutching mechanism for locking the manipulating member 27. The bar 91 is preferably of U-shaped cross section throughout a major portion of its length for purposes of rigidity, the side walls of the U-shape being in sliding contact with the side walls 30 and 31 of member 27.

Positioned between the side walls 30 and 31 of member 27 is a bracket 95 having upwardly extending wall portions 96 and 97 spotwelded or otherwise secured to the side walls of member 27, the bracket having a hook-like projection 98 which is adapted to support and position a spring 100 as particularly shown in Figure 2, the spring engaging a clutch means or roller 102. It is to be noted that the bracket 95 has an inclined portion 99 so that the clutch 102 may be wedged between the inclined portion 99 and the lower wall or uniplanar portion 14 of the housing 10, and when the clutch is urged into such wedging position under the influence of spring 100, it serves to hold member 27 against relative movement with respect to the stationary housing 10. The bar 91 terminates adjacent the clutch 102 so that when it is desired to unlock or release member 27 so that it may be moved in a left hand direction as viewed in Figure 2, it is only necessary to depress the finger trigger 79 causing bar 91 to move the clutch 102 out of wedging engagement between the inclined portion 99 and wall 14 of the housing 10. Bar 91 is provided with a depending portion or ear 104 and the wall 14 of the housing is provided with a screw 105 so that member 27 may be prevented from being entirely withdrawn from the housing 10 by reason of engagement of the ear 104 with screw 105 as shown in dotted lines in Figure 2.

The gears 53, 54 and 55 are all fixed to the shaft 46 by any suitable means, that shown being to provide the shaft with a flattened portion 46' and the gears with corresponding central openings to fit the flat portion of the shaft so that force and motion will be positively transmitted through gears 53 and 55 to gear 54 and thence to the rack or drawbar 38.

In the operation of the arrangement of my invention as illustrated in the form shown in Figures 1 through 10, the brake mechanism may be connected by means of a cable 101 to the clevis 37' and drawbar 38, the latter being centrally positioned in the guide member 36 and having its toothed portion in mesh with gear 54. The mechanism is shown in "brake released" position in Figure 2. When it is desired to "set" the brakes or move the rack 38 toward the right hand direction as illustrated in Figures 1 and 2, the grip portion 65 is grasped by the operator and by exerting a pull in a right hand direction, member 27 and the mechanism carried thereby are moved longitudinally with respect to the housing 10. When the member 27 is moved in this direction, the clutch 102 is ineffective by reason of the upwardly and forwardly inclined surface 99 of bracket 95 so that the member 27 may be moved freely carrying with it the gearing 53, 54 and 55. As the gears 53 and 55 are in mesh with the toothed racks 16 and 17, there will be rotary movement imparted to these gears by their movement along racks 16 and 17 and a rotary movement of gear 54 causing the rack or drawbar 38 to also be moved in the right hand direction as viewed in Figure 2. The difference in the amount of longitudinal movement of member 27 with respect to the movement of member 38 is dependent upon the difference in the pitch diameter of gears 53 and 55 with respect to that of gear 54. For example, in the embodiment shown the difference of pitch diameters between these gears is in the ratio of one to four. Thus, if member 27 is withdrawn a distance of four inches, member 38 is moved in the same direction one-fourth the distance or one inch. The multiplication of force being proportional to the movement, the amount of force applied to withdraw member 27 toward brake setting position is multiplied so that four times the force is applied to the braking mechanism through the drawbar 38, clevis 37', and cable 101. When the brakes have been actuated by relative movement of member 27 until they have been moved to "set" position, the clutch 102 under the influence of spring 100 is forced to wedging position between surface 99 and wall 14 of the housing to lock the member 27 and the drawbar 38 in "brake setting" position. During movement of member 27 the rollers 58 and 59 serve to minimize the friction and prevent binding of the slidable elements. When it is desired to release the brakes, it is only necessary for the operator to move the trigger 79 in a counter-clockwise direction about the pivot point 80 thus urging bar 91 against the clutch 102 to move the latter out of clutching engagement, the member 27 may then be slidably moved to brake releasing position, that is, approaching the position as illustrated in Figure 2.

Figures 11 through 15 inclusive illustrate a modified form of my invention wherein there is provided an elongated hollow casing or housing 110 which is generally of C-shaped configuration in cross section, as is illustrated in Figures 13 and 14. The housing 110 is formed with top and bottom portions 111 and 112 respectively, a connecting side wall portion 113, upwardly extending flange 114, and a downwardly extending flange 115, the latter extending only throughout a minor portion of the length of the housing. The upper edge of flange 114 is provided with a series of rack teeth 116.

Slidably positioned within the hollow interior of the housing 110 is a U-shaped member 119 having side walls 128 and 121, the member 119 being of a dimension to be slidably movable within the housing 110. Secured to the rear portion of member 119 is a handle or grip portion 120 preferably formed of two similarly shaped matched sections 122 secured together by means of rivets 123 and to member 119 by means of rivets 124. Pivoted to member 119 by means of a pin or rivet 125 is a finger piece or trigger 126 which is urged to the position illustrated in Figure 12 under the influence of a hairpin-like spring 127 having a central portion coiled about the pivot pin 125, one leg portion of the spring 130 engaging rivet 124 while the opposite leg portion 131 bears against the finger trigger 126. Pivotally secured to the finger trigger by means of pin 132 is a longitudinally extending bar 133 forming a part of clutch releasing mechanism to be hereinafter explained.

The side walls 120 and 121 of the forward portion of member 119 are brought closer together as illustrated in Figure 11 and have punched openings bounded by flanges 134 and 135 to provide bearings or journals for a stub shaft 136. The shaft 136 is provided with a portion 137 which is journalled in bearing 134 and is fixed to a gear 138 positioned between the walls 120 and 121 of member 119. The shaft portion 137 has a flat portion 139 and the gear is provided with correspondingly shaped opening fitting the shaft so that the gear and shaft are caused to rotate together. The shaft 136 is provided with a reduced portion 140 which carries at its outer extremity a gear 141 of larger diameter than gear 138, gear 141 being mounted to rotate with the shaft through the medium of a flattened portion 145 thereon, the end of the shaft being riveted over or swaged as illustrated at 146 to hold gear 141 on the shaft.

Slidably positioned immediately beneath gear 138 and extending longitudinally of the housing 110 is a drawbar or rack 147 having its toothed portion in engagement with gear 138, the rack having a depending projection 149 which is connected by means of a pin 150 to a clevis 151, the latter in turn being connected to a flexible cable 152 contained within a sheath 153 which is adapted to be connected to brakes of the vehicle to be actuated by the mechanism of my invention. The sheath 153 may be secured in position by means of a bracket 154 fastened to the casing 110 by means of a screw 155 or may be welded to the same if desired.

Positioned intermediate the side walls 120 and 121 of member 119 is a clutch or locking pawl 160 pivotally supported upon a pin or rivet 161 passing through the side walls of member 119. The member 160 is provided with a toothed pawl or projection 162 which is adapted to engage between teeth of gear 138 to lock the gear 138, member 119 and drawbar 147 in predetermined position. The member 160 is provided with an opening 163 having a restricted throat portion and the extremity of bar 133 is provided with an end portion 164 adapted to extend into the opening 163 so as to connect the bar 133 with clutch member 160, the bar having a restricted neck portion 165 to permit relative oscillatory movement of portion 164 in the opening 163 to permit the withdrawal of the tooth 162 from enmeshment with gear 138 in order to prevent metallic rattles or vibratory noises preferable to surround a portion of the bar 133 with a sleeve 167 of rubber or other suitable non-metallic material.

The operation of this form of the invention is substantially the same as that of the form of the invention previously described, that is, when it is desired to set the brakes of the vehicle, the operator grasps the handle portion 120 drawing member 119 away from housing 110, the latter being fixedly secured to some portion of the vehicle. Due to the difference in diameters of gears 138 and 141, outward movement of member 119 causes a corresponding longitudinal movement of the drawbar or rack 147 in the same direction, but through a lesser distance depending upon the difference of the diameters of gears 138 and 141, in the embodiment this being in a ratio of one to four so that a withdrawal of member 119 through a distance of four inches from the housing 110 causes a longitudinal movement of the drawbar 147 and consequently the brake actuating cable 152 moves through a distance of one inch. The member 119 is withdrawn until the brakes have been brought to "set" position, in which position the projection or pawl 162 of the clutch means engages between two teeth in the gear 138 to hold the mechanism in the "brake setting" position. When it is desired to release the brake mechanism the operator moves the trigger 126 in a counterclockwise direction about pivot pin 125 which causes a longitudinal movement of bar 133 and a withdrawal of projection or pawl 162 from engagement with gear 138 as illustrated in Figure 15, after which a force exerted longitudinally of member 119 to slide or telescope the latter into the housing 110 causes the drawbar 147 to be moved toward brake releasing position.

It is to be understood that the ratio between the diameters of gears 138 and 141 may be varied to change the amount of force applied in setting the brakes through the mechanism of my invention and that the movement of member 119 with respect to drawbar 147 is proportional to the forces transmitted. Thus, if the difference between the diameters is one-eighth and member 118 is moved through a distance of eight inches, the drawbar 147 will only move through a distance of one inch, but the force applied to withdrawing member 119 is multiplied eight times to the drawbar 147. Thus, through the medium of my invention practically any ratio of amplitude of movement to the amplitude of force may be secured by merely changing the diameters of the gears interconnecting gears between the drawbar and the manipulating element.

It is apparent that within the scope of the invention, modifications and different arrangements may be made other than is herein disclosed, and the present disclosure is illustrative merely, the invention comprehending all variations thereof.

What I claim is:

1. Mechanism control including a support; a pair of elements slidably mounted upon the support and arranged for movement in parallel directions and relative to said support; motion translating means interposed between said elements whereby movement of one of said elements is transmitted to the other of said elements; means for locking one of said elements against movement with respect to said support; one of said elements having a hand grip portion associated therewith; and means mounted adjacent said hand grip portion and cooperatively associated with said locking means for releasing the locking means.

2. Mechanism control including a support; a pair of elements mounted in parallel relation upon the support and arranged for longitudinal slidable movement relative thereto; motion translating means interposed between said elements rotatable with respect thereto and being longitudinally movable by one of said elements whereby movement of one of said elements is transmitted to the other of said elements; means for locking one of said elements against movement with respect to said support; and means cooperatively associated with said locking means for releasing the latter.

3. Mechanism control including a support; a manipulating member carried by said support arranged for longitudinal slidable movement relative thereto; a second member carried by said support arranged for longitudinal slidable movement in parallel relation with said manipulating member; and means interposed between said members for rotary movement with respect thereto and for sliding movement with the manipulating member whereby longitudinal movement imparted to the manipulating member is transmitted with a change in amplitude to the second member.

4. A mechanism control including a tubular support; a member adapted for connection to the mechanism to be operated carried by and movable within said tubular support; a manually movable member carried by said support; motion changing gears interposed between said members freely rotatable with respect to both of said members whereby manual longitudinal movement of one of said members causes the other of said members to move at a different rate, and means for locking one of said members against movement with respect to said support.

5. Mechanism control including a support; a pair of elements slidably carried by said support and movable in parallel directions with respect thereto; motion multiplying means connecting said elements whereby slidable movement of one of said elements in one direction causes differential slidable movement of the other of said elements in the same direction; means for locking one of said elements with respect to said support; one of said elements having a hand grip portion; a finger piece mounted adjacent said hand grip portion; and means connected to said finger piece and cooperatively associated with said locking means for releasing the locking means.

6. Mechanism control including a tubular support; a pair of elements slidably carried within said support; motion translating means interposed between said elements whereby movement of one of said elements causes differential movement of the other of said elements; clutch means for locking one of said elements with respect to said support; one of said elements having a hand grip portion secured thereto; a pivoted finger piece associated with said hand grip portion; and means connecting said finger piece and said clutch means for releasing said clutching means.

7. Mechanism control including a hollow support; a pair of elements slidably mounted in said hollow support; gearing freely rotatable with respect to said elements whereby linear movement of one of said elements causes differential movement of the other of said elements; and means for restraining longitudinal movement of one of said elements with respect to said support.

8. Mechanism control including a tubular support; a pair of elements slidably mounted within said tubular support; gearing freely journalled upon one of said elements and being interposed between said elements whereby movement of one of said elements causes differential movement of the other of said elements; and longitudinally movable means for locking one of said elements against movement with respect to said tubular support.

9. Mechanism control including a hollow supporting member having a rack portion; an element aranged for longitudinal slidable movement and carried within said support; a second element slidable within said support and having a toothed rack portion; a pair of spur gears of different diameters journalled upon said first mentioned element for rotary movement thereof and longitudinal movement therewith and meshing respectively with the rack portion of said support and the rack portion of said second element whereby movement of one of said elements effects a differential movement of the other of said elements.

10. Mechanism control including a support having a rack portion; an element mounted upon and slidable with respect to said support; said element having a rack portion; a pair of spur gears of different diameters meshing respectively with the rack portions of said support and said element; and means longitudinally movable for restraining slidable movement of said element with respect to said support.

11. Mechanism control including a support having a rack portion; an element mounted upon and slidable with respect to said support; said element having a rack portion; a pair of spur gears of different diameters meshing respectively with the rack portions of said support and said element; means for locking said gears; spring means for urging said locking means toward locked position; and means for releasing said locking means.

12. Mechanism control including a hollow supporting member having a rack portion; an element arranged for slidable movement and carried within said support; a second element slidable within said support and having a rack portion; a pair of spur gears of different diameters carried by said first mentioned element meshing respectively with the rack portion of said support and the rack portion of said second element whereby movement of said first mentioned element effects a differential movement of said second element through said gears; locking means for locking the gears against movement relative to said support; said first mentioned element having a hand grip portion secured thereto; a finger piece movably associated with said hand grip portion; and means connecting said finger piece with said locking means for effecting a release of the locking means.

13. Mechanism control including a hollow supporting member having a rack-like wall portion; an element arranged for slidable movement and carried within said support; a second element slidable within said support and having a toothed rack portion; a pair of spur gears of different diameters carried by said first mentioned element meshing respectively with the rack portion of said support and the rack portion of said second element whereby movement of said first mentioned element effects a differential movement of said second element through said gears; locking means for locking the elements in adjusted position; said first mentioned element having a hand grip portion secured thereto; a finger piece pivotally mounted adjacent said hand grip portion; and means connecting said finger piece with said locking means whereby independent movement of said finger piece effects a release of the locking means.

14. Mechanism control including a hollow supporting member formed of sheet metal and having a rack-like wall portion; an element arranged for slidable movement and carried within said support; a second element slidable within said support and having a toothed rack portion; a pair of spur gears of different diameters journalled upon said first mentioned element and meshing respectively with the rack portion of said support and the rack portion of said second element whereby movement of said first mentioned element effects a differential movement of said second element through said gears; a pawl carried by said elements and adapted to cooperate with one of said gears for locking the latter against movement with respect to said support; said first mentioned element having a hand grip portion secured thereto; spring means for normally urging said pawl to locking position; and means connected with said pawl for effecting a release of the gears.

15. Mechanism control including a hollow supporting member having a rack portion; an element arranged for slidable movement and carried within said support; a second element slidable within said support and having a toothed rack portion; a pair of spur gears of different diameters journalled upon said first mentioned element and meshing respectively with the rack portion of said support and the rack portion of said second element whereby movement of said first mentioned element effects a differential movement of said second element through said gears; clutch means arranged to lock said elements against movement with respect to said support; spring means for normally urging said clutch means toward locked position; said first mentioned element having a hand grip portion of non-metallic material; and means associated with said clutch means for effecting a release thereof.

16. Mechanism control including a hollow supporting member having a rack portion; an element arranged for slidable movement and carried within said support; a second element slidable within said support and having a toothed rack portion; a pair of spur gears of different diameters carried by said first mentioned element and meshing respectively with the rack portion of said support and the rack portion of said second element whereby movement of said first mentioned element effects a differential movement of said second element; and locking means locking said elements against movement relative to said support.

17. Mechanism control including a hollow supporting member having a rack portion; an element arranged for slidable movement and carried within said support; a second element slidable within said support and having a toothed rack portion; a pair of spur gears of different diameters carried by said first mentioned element meshing respectively with the rack portion of said support and the rack portion of said second element whereby movement of said first mentioned element effects a differential movement of said second element through said gears; and locking means cooperatively associated with one of said elements and said support for locking the elements in adjusted position.

CHARLES S. McCARTHY.